United States Patent
Derocher et al.

(10) Patent No.: US 6,961,859 B2
(45) Date of Patent: Nov. 1, 2005

(54) COMPUTING DEVICE HAVING PROGRAMMABLE STATE TRANSITIONS

(75) Inventors: Michael D Derocher, Corvallis, OR (US); Steven L Fogle, Corvallis, OR (US)

(73) Assignee: Hewlett Packard Development Company, L.P, Houston, TX (US)

(*) Notice: Subject to any disclaimer, the term of this patent is extended or adjusted under 35 U.S.C. 154(b) by 640 days.

(21) Appl. No.: 10/066,378

(22) Filed: Jan. 30, 2002

(65) Prior Publication Data

US 2003/0145242 A1 Jul. 31, 2003

(51) Int. Cl.⁷ .............................................. G06F 13/14
(52) U.S. Cl. ..................... 713/320; 713/323; 713/322; 710/15
(58) Field of Search ................. 713/320, 323, 713/322; 710/15

(56) References Cited

U.S. PATENT DOCUMENTS

| | | | | |
|---|---|---|---|---|
| 5,542,035 A | * | 7/1996 | Kikinis et al. ............... | 713/323 |
| 5,590,342 A | * | 12/1996 | Marisetty ..................... | 713/324 |
| 5,902,352 A | * | 5/1999 | Chou et al. .................. | 718/102 |
| 5,974,552 A | * | 10/1999 | Lim et al. .................... | 713/300 |
| 5,978,922 A | * | 11/1999 | Arai et al. ................... | 713/323 |
| 6,065,123 A | | 5/2000 | Chou et al. | |
| 6,070,215 A | * | 5/2000 | Deschepper et al. ........ | 710/309 |
| 6,189,106 B1 | * | 2/2001 | Anderson ................... | 713/300 |
| 6,330,069 B1 | * | 12/2001 | Kim .......................... | 358/1.14 |
| 6,539,485 B1 | * | 3/2003 | Liu et al. .................... | 713/323 |
| 6,598,170 B1 | * | 7/2003 | Nagashima ................. | 713/340 |
| 6,654,895 B1 | * | 11/2003 | Henkhaus et al. .......... | 713/320 |
| 2002/0007463 A1 | | 1/2002 | Fung | |

* cited by examiner

*Primary Examiner*—A. Elamin
(74) *Attorney, Agent, or Firm*—Jeff D. Limon

(57) ABSTRACT

A computing device having programmable state transitions is disclosed. The device includes a real-time clock that generates a signal in response to the real-time clock attaining a programmed time of day. The device additionally includes a processor, coupled to the real-time clock that receives the signal and transitions from a first state to a second state, such as from a hibernate state to a standby state.

12 Claims, 5 Drawing Sheets

Transition Schedule

| Event | Standby | Active | Hibernate | Active | Hibernate |
|---|---|---|---|---|---|
| Time | 6:00 AM | 8:00 AM | 12:00 PM | 1:00 PM | 6:00 PM |

COMPUTING DEVICE HAVING PROGRAMMABLE STATE TRANSITIONS

BACKGROUND OF THE INVENTION

The invention pertains generally to computing devices and, more particularly, to computing devices that transition between operating states.

Many computing devices, such as portable laptop computers, handheld computers, and processor-based portable messaging devices, include a battery that allows the computing device to be temporarily operated at virtually any location, without regard to the availability of primary power from an external source. To extend the length of time that a user can operate the portable computing device away from the external source, many users carry extra batteries that can be installed when needed to continue operating the device.

When portable computing devices are used in office environments, many users operate these devices according to predictable schedules. For example, a particular computing device user may come to work at a certain time every day, eat lunch at a certain time, and leave at a certain time. During lunch, and after the user leaves the office for the day, the user generally shuts off the computing device so that battery power can be conserved. This prolongs the life of the battery so that the portable computing device is available for use over a period that may include several days or longer.

In the event that the user does not remember to shut off the portable computing device, the device may remain operational for a lengthy period of time before being inactivated. Thus, upon returning to the device, the user may find that the computing device's battery has been depleted. This, in turn, requires that the user either replace the battery or return to a location where the device can be powered by an external source. The need to be constantly attentive to device power consumption, as affected by the operating state of the device, reduces the utility of the device.

DESCRIPTION OF THE PREFERRED EMBODIMENTS

A computing device having programmable state transitions allows a user to program the device with times of day at which the device enters particular operating states. This allows the device's power consumption to be programmably reduced at certain scheduled times while being increased at other times. The program control illustrated by the embodiments herein can allow the battery life of the computing device to be extended so that the device can be available for use over a longer period of time without recharging or replacing an associated battery, or requiring the user to find an external source with which to power the device.

Figure 1:
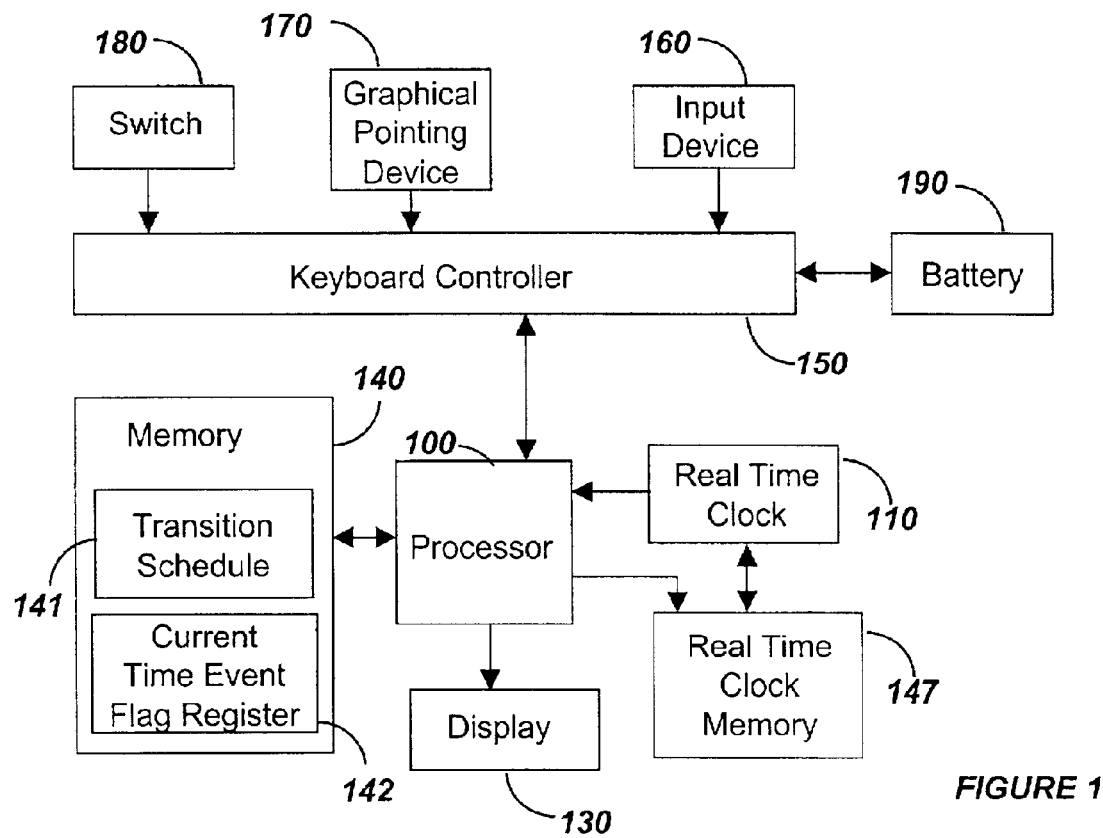
FIG. 1 is a block diagram of a computing device that programmably transitions between states in accordance with a preferred embodiment of the invention.

FIG. 1 is a block diagram of a computing device that programmably transitions between states in accordance with a preferred embodiment of the invention. In FIG. 1, processor 100 runs an operating system and may run one or more application programs that allow the user of the computing device to interact with the computing device to perform various tasks. These tasks can include, but are not limited to, word processing, electronic mail, spreadsheet calculations, and so forth. The user preferably interacts with the computing device of FIG. 1 using input device 160, which may include a keyboard, keypad, or other type of input device that controls the placement of characters or symbols on display 130. In addition to interacting with input device 160, the user may also interact with graphical pointing device 170, which may include a mouse, trackpad, trackball, or other device used to position a cursor or other indicator on display 130 of the computing device.

In the embodiment of FIG. 1, switch 180 enables the user to control at least some of the operating states in which the computing device of FIG. 1 is capable of operating. For example, switch 180 may control the transition from a hibernate state to an active state. In addition to switch 180, one or both of input device 160 and graphical pointing device 170 may also be used to control the operating state of the computing device of FIG. 1. Preferably, inputs from switch 180, graphical pointing device 170, and input device 160 are conveyed to keyboard controller 150. Keyboard controller 150 receives these inputs and requests processor 100 to transition to a particular operating state. Keyboard controller 150 also communicates with battery 190 by way of a logic unit (not shown) that monitors the health and status of the battery.

Keyboard controller 150 responds to various unscheduled power management events that occur within the computing device represented by FIG. 1. In the embodiments of the invention described herein, an unscheduled power management event is an event that affects the delivery of operating power to the computing device. An example of an unscheduled power management event can be a signal communicated from battery 190 indicating that the battery is no longer capable of supplying sufficient current to operate the computing device in its present operating state. Another example of an unscheduled power management event can be the user depressing switch 180 or interacting with either or both of graphical pointing device 170 and input device 160 in order to change an operating state of the computing device of FIG. 1. These unscheduled power management events are conveyed to processor 100 by way of keyboard controller 150.

In a preferred embodiment, a programmed time of day is input by the user of the computing device of FIG. 1. The programmed time of day is stored within real-time clock memory 147, which is accessible to real-time clock 110. When real-time clock 110 attains a time of day that is substantially equal to the programmed time of day, the real-time clock generates a signal that is received by processor 100. In response to the received signal, processor 100 reads current time event flag register 142 within memory 140. Processor 100 then transitions the computing device of FIG. 1 to an operating state requested by the current time event flag stored within register 142. Although not shown, real-time clock 110 preferably makes use of a dedicated battery that provides power to the real-time clock.

In a manner that accords with the input of a single time of day, a user preferably interacts with the computing device of FIG. 1 to input a set of programmed times of day as well as a time event flag that corresponds to each of the programmed times of day. Each programmed time of day and the corresponding time event flag are stored as an element of transition schedule 141 within memory 140. As previously mentioned, in response to the signal generated by real-time clock 110 attaining a programmed time of day stored in real-time clock memory 147, processor 100 reads current time event flag register 142. After reading current time event flag register 142 and transitioning the computing device to the appropriate operating state, processor 100 reads the next element of transition schedule 141 within memory 140. The next (i.e. upcoming) programmed time of day is then stored into real-time clock memory 147 and the next current time event flag is stored in current time event flag register 142, thereby preparing the computing device for the next scheduled transition.

The embodiments of the invention disclosed herein contemplate a hibernate state. In the hibernate state, processor 100 as well as other functional units of FIG. 1, with the exception of real-time clock 110, are not operational. In the hibernate state, the computing device of Figure1 does not consume a substantial amount of power. Prior to entering the hibernate state, processor 100 may perform various functions in which information relative to the user's activities is stored or saved within memory 140, or within other memory media accessible to processor 100 that are not shown in FIG. 1. It is contemplated that the transition from the hibernate to the active state requires an amount of time sufficient to be a nuisance or to at least be noticeable to the user.

The embodiments of the invention disclosed herein also contemplate a standby state. In the standby state, processor 100 may retain some operational capability, but perhaps at a reduced level. Memory 140 may also be operational and available to processor 100 in the standby state, while various other devices coupled to processor 100 may not be operational. These other devices include display 130, input devices, as well as any hard disks or other memory media that consume power due to the motion of the media relative to a fixed reading or writing mechanism. In the standby state, real-time clock 110 continues to be operational. It is contemplated that the transition from the standby to the active state does not require the length of time needed to transition from the hibernate to the active state.

The embodiments of the invention disclosed herein also contemplate an active state. In the active state, substantially all of the components of FIG. 1 are operational. The active state corresponds to a state in which a user may perform various interactions with the computing device of FIG. 1. During transitions between states, such as from hibernate to standby, the computing device represented by FIG. 1 may briefly enter the active state. This brief entry may be required so that processor 100 can perform logic related operations such as reading elements of transition schedule 141, storing information into memory 140 and real-time clock memory 147, and so forth.

Figure 2:
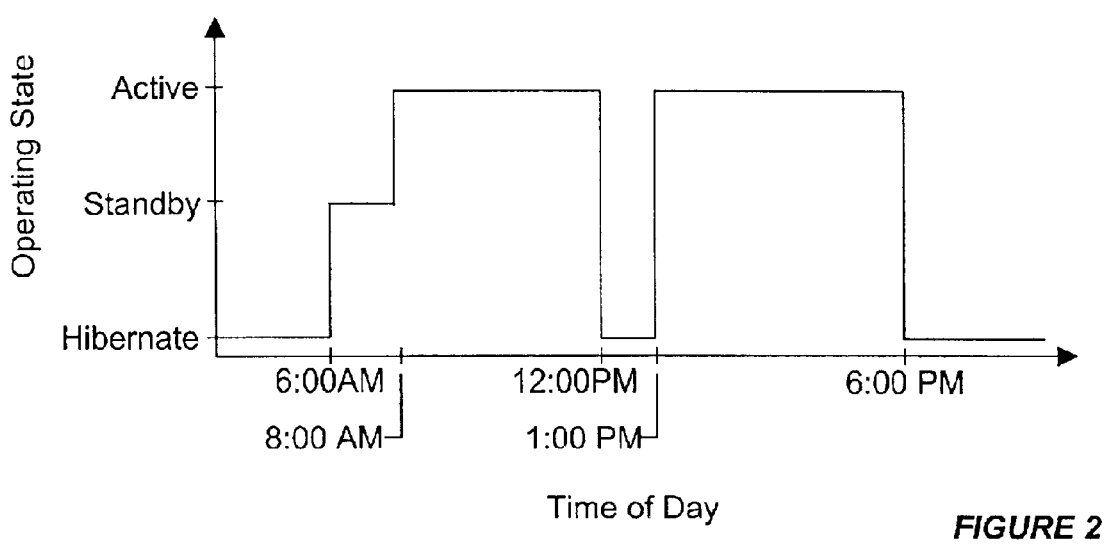
FIG. 2 is a graph of computing device power consumption versus time of day in accordance with a preferred embodiment of the invention.

FIG. 2 is a graph of computing device power consumption versus time of day in accordance with a preferred embodiment of the invention. In FIG. 2, the hibernate, standby, and active states are shown on the vertical axis as corresponding to various power consumption levels. Thus, when in the hibernate state, the computing device requires very little power. In the standby state, some power is consumed, such as that required to operate memory 140 of FIG. 1. In the active state, a higher level of power is consumed, such as would be required to operate processor 100, display 130, input and pointing devices 160 and 170, memory 140, as well as any disk drives accessible to processor 100.

The horizontal axis of FIG. 2 shows a time of day. Thus, as each day progresses, the computing device of FIG. 1 transitions to certain operating states according to a programmed schedule that is repeated each day. Therefore, in the example of FIG. 2, the computing device is programmed to transition from the hibernate state to the standby state at 6:00 AM. The computing device is maintained in the standby state from 6:00 AM until 8:00 AM. At 8:00 AM, the computing device transitions from a standby to an active state. At 12:00 PM, the computing device transitions from the active state to hibernate, and transitions back to the active state at 1:00 PM. From 1:00 PM until 6:00 PM, the computing device is maintained in the hibernate state. The device is maintained in the hibernate state from 6:00 PM until 6:00 AM the following day, when the process repeats.

As previously mentioned herein, the times of day at which the various state transitions occur are under the control of the user of the computing device. Thus, the user may wish to transition from hibernate to standby at an earlier or later time than the 6:00 AM transition time shown in FIG. 2. Additionally, the user may not wish for the computing device to programmably enter the active state at any time of day. The flexibility to adjust the times of day at which the various state transitions occur, as well as the states which are transitioned to, are contemplated as being under the control of the user of the computing device. Further, there is no upper limit to the number of transitions between the hibernate, standby, and active states. Thus, the user may choose numerous transitions between these states throughout the day, week, or other period.

Figures 3, 7:
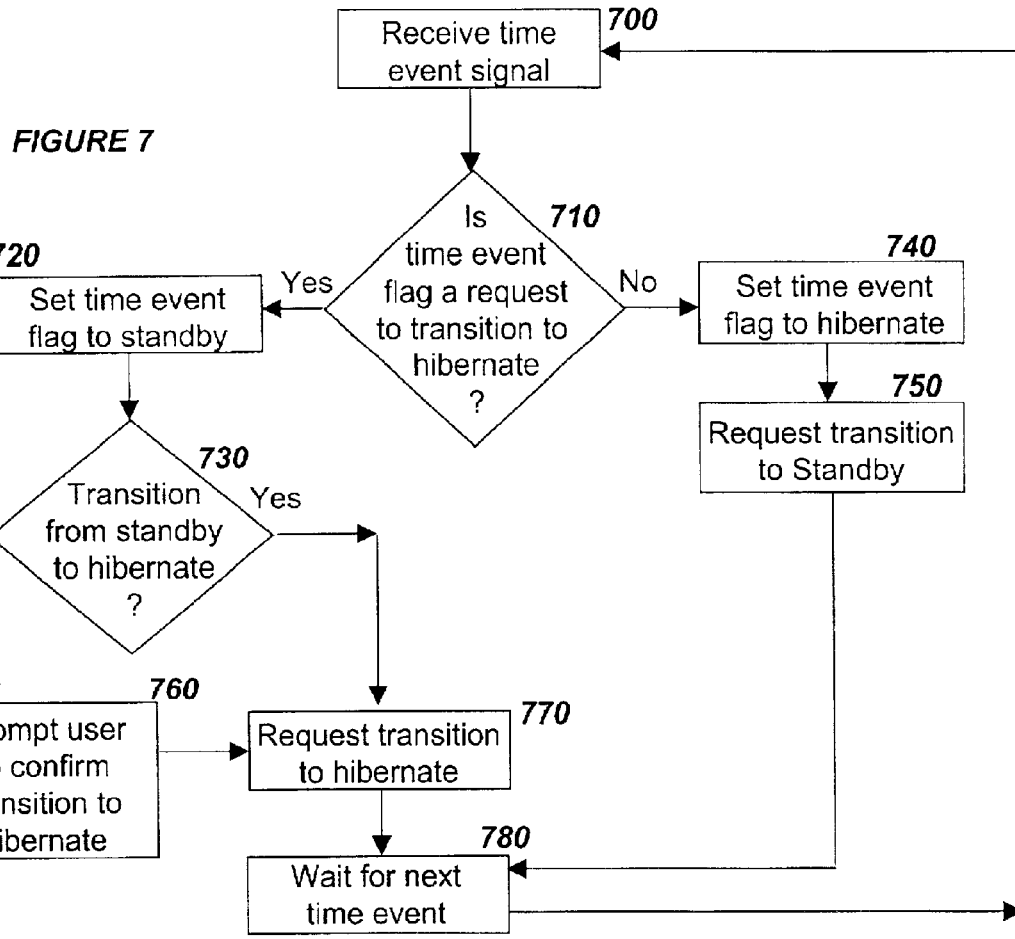
FIG. 3 is a panel presented to a user in association with a program that allows the user to input a state transition time schedule into a computing device in accordance with a preferred embodiment of the invention.
FIG. 7 is a flowchart for a method of responding to a time event used in a computing device having programmable state transitions in accordance with a preferred embodiment of the invention.

FIG. 3 is a panel presented to the user in association with a program that allows the user to input a state transition time schedule into a computing device in accordance with a preferred embodiment of the invention. FIG. 3 includes fields that allow the user to program the computing device with a desired state transition schedule. As shown in the example of FIG. 3, the computing device has been programmed to transition to the standby state at 6:00 AM, to transition to the active state at 8:00 AM, to transition into and out of the hibernate state at 12:00 PM and 1:00 PM (respectively), and to transition to the hibernate state at 6:00 PM.

Preferably the "Standby", "Active", and "Hibernate" fields of FIG. 3 are selectable. For example, in the event that the user does not wish the computing device to programmably enter the hibernate state, the user may select "Standby" in lieu of the "Hibernate" selection. In this case, the computing device would transition from the standby to the active state at 8:00 AM and return to the standby state at 6:00 PM.

In an alternate embodiment of the invention, additional columns are added to the panel of FIG. 3. For example, in the event that the user wishes to transition the computing device to a standby state during a daily meeting time, such as from 9:00 AM until 10:00 AM, for example, additional columns may be added to accommodate these additional transitions. Further, additional rows may be added to include transitions that are desired during weekends and holidays.

Figure 4:
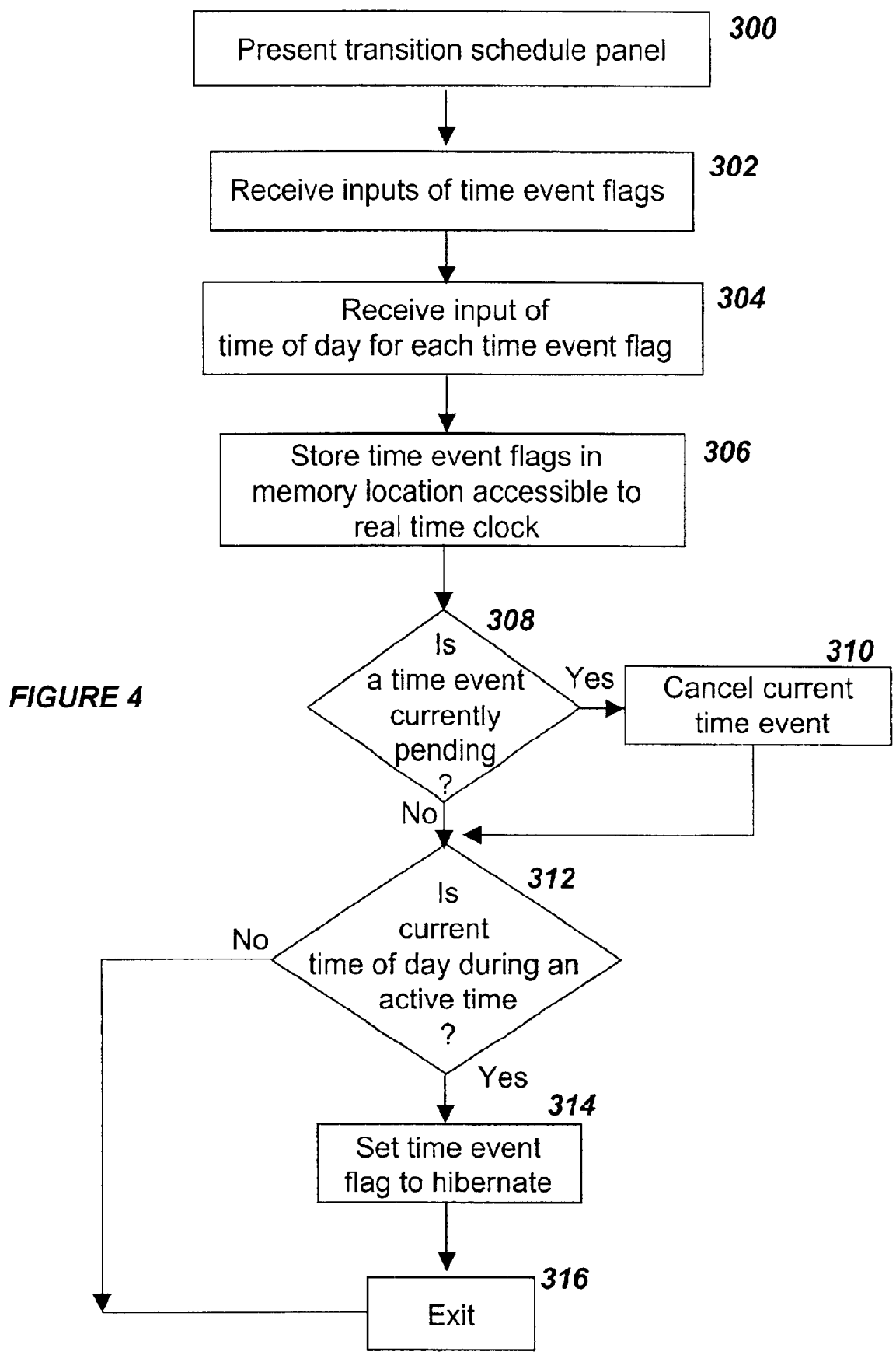
FIG. 4 is a flowchart for a method used to program a computing device to perform time event driven state transitions in accordance with a preferred embodiment of the invention.

FIG. 4 is a flowchart for a method used to program a computing device to perform time event driven state transitions in accordance with a preferred embodiment of the invention. The computing device of FIG. 1, operating in conjunction with an operating system that runs on processor 100, is suitable for performing the method. The term "time event" as used herein includes events programmably scheduled by the user. By performing the method of FIG. 4, the computing device can be initialized so that time event flags, such as those described in reference to FIG. 7, can be responded to.

The method of FIG. 4 begins at block 300 in which a transition schedule panel, such as that shown in FIG. 3, is presented to a user. The method continues at block 302 in which time event flags, such as the Active, Standby, and Hibernate flags are received. The method continues at block 304 in which the computing device receives the times of day corresponding to the time event flags received in block 302. At block 306, each time of day (as programmed by the user) as well as a time event flag corresponding to each programmed time of day are stored as elements of a transition schedule within a memory of the computing device. Block 306 can also include removing the transition schedule panel presented to the user in block 300.

The method continues at block 308, in which a determination is made as to whether a time event is currently pending. If a time event is currently pending, block 310 is executed in which the time event is canceled and the method continues at block 312. If a time event is not currently pending, the method continues at block 312 without canceling the current time event flag.

At block 312, a determination is made as to whether the current time, as reported by a real-time clock for example, corresponds to a current scheduled active time period. If the current time does correspond to an active period, block 314 is executed in which the current time event flag is set to hibernate. This permits the computing device to automatically transition to hibernate when the next time event occurs, such as would be expected at 6:00 PM in the example of FIG. 2. The method then exits at block 316. If the current time does not correspond to a scheduled active time period, the method proceeds directly to the exit block, 316.

Figure 5:
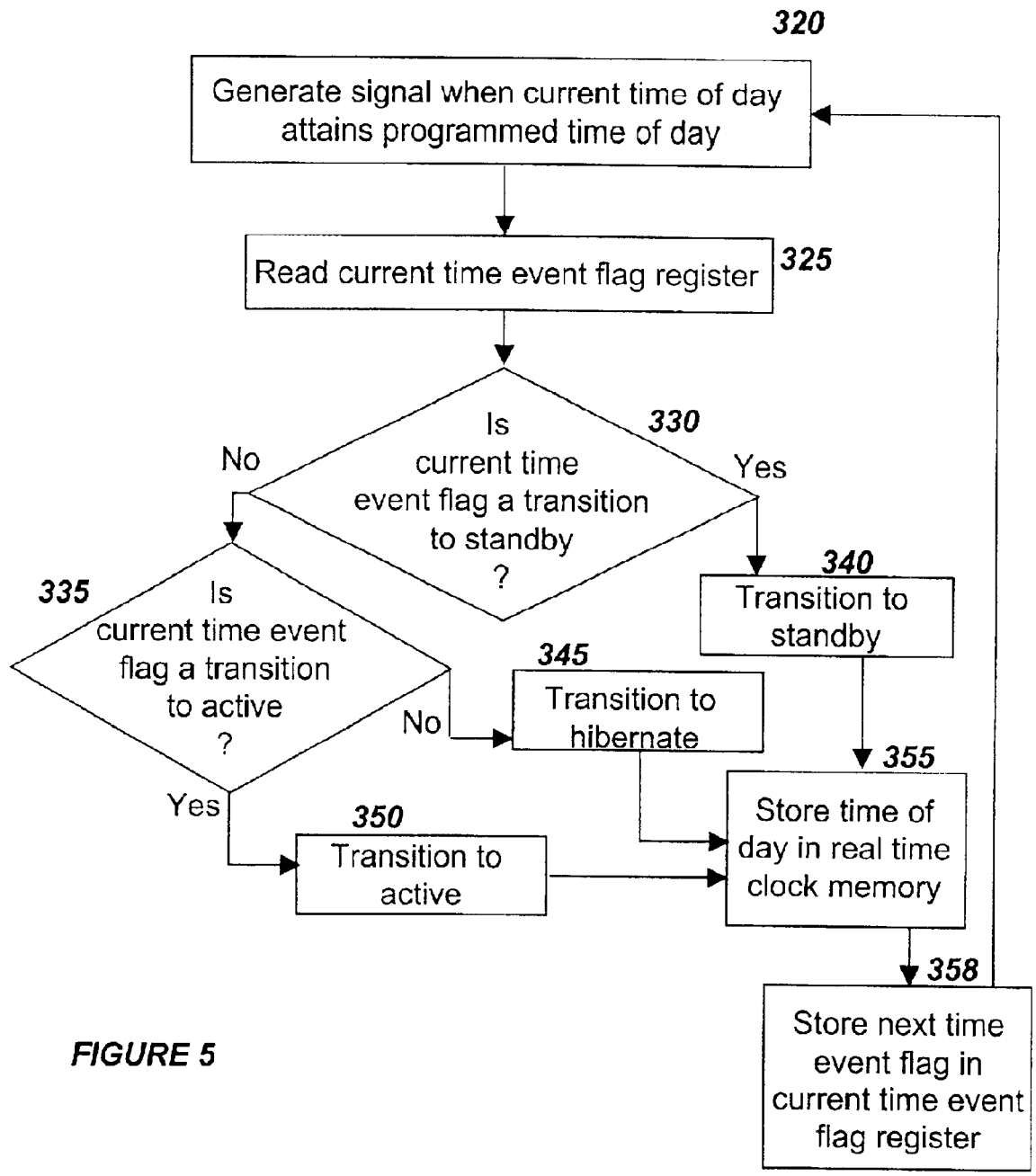
FIG. 5 is a flowchart for a method used by a computing device for transitioning from a hibernate to a standby state in accordance with a preferred embodiment of the invention.

FIG. 5 is flowchart for a method used by a computing device for transitioning between states in accordance with a preferred embodiment of the invention. The computing device of FIG. 1, operating in conjunction with an operating system that runs on processor 100, is suitable for performing the method. The state transitions of FIG. 2 are used for the example of FIG. 5.

The method of FIG. 5 begins at block 320, in which a real-time clock generates a signal when the current time of day attains a programmed time of day. The method continues at block 325, in which a processor reads a current time event flag register in response to receiving the signal. The method continues at block 330, in which the current time event flag is examined to determine if the flag corresponds to a transition to a standby state. If the received time of day event flag does correspond to a request to transition to standby, block 340 is executed in which the computing device begins the transition to standby. The method continues at block 355 in which the next (or upcoming) time of day is stored in a memory location accessible to the real-time clock. At block 358, the method continues with storing the current time event flag that corresponds to time of day stored in block 355. Control then returns to block 320, wherein a signal is generated when the current time of day attains the programmed time of day stored within the memory accessible to the realtime clock. The method of FIG. 5 can then be repeated throughout the day according to a programmed schedule such as that programmed by way of the transition schedule panel of FIG. 3, for example.

Retuning now to block 330, if the decision of block 330 indicates that the current time event flag is not a transition to a standby state, block 335 is executed in which the current time event flag is evaluated to determine if the flag is request to transition to an active state. If the decision of block 335 indicates a request to transition to an active state, block 350 is executed in which the computing device is transitioned to an active state. The method continues at block 355 in which in which the next (or upcoming) time of day is stored in a memory location accessible to the real-time clock. The method continues at block 358 with storing the current time event flag that corresponds to time of day stored in block 355. Control then returns to block 320, wherein a signal is generated when the current time of day attains the programmed time of day stored within the memory accessible to the real-time clock.

If the decision of block 335 indicates that the received time of day event flag is not a request to transition the computing device to the active state, block 345 is executed in which the processor transitions the computing device to the hibernate state. The method continues at block 355 in which in which the next time of day is stored in a memory location accessible to the real-time clock. The method continues at block 358 with storing the current time event flag that corresponds to time of day stored in block 355. Control then returns to block 320.

In the embodiment of FIG. 5, various blocks have been included in the method in order to illustrate details that may be useful in some applications. However, another method of transitioning between states may only require blocks 320, in which a real-time clock generates a signal when the current time of day attains a programmed time of day, as well as one of blocks 340, and 350 in which a processor transitions from a hibernate to a standby state (block 340) or to an active state (block 350) in response to receiving the signal.

Figure 6:
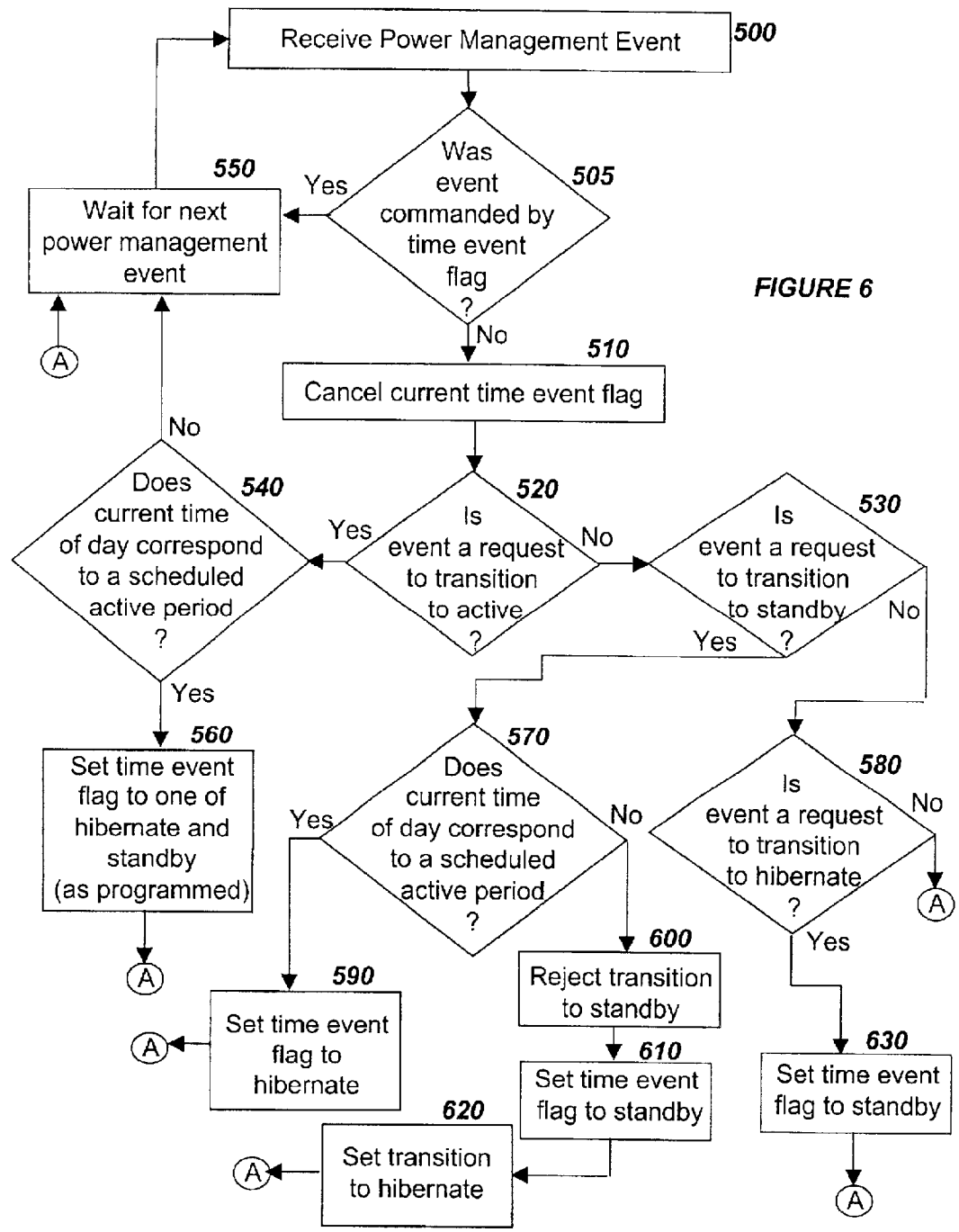
FIG. 6 is a flowchart for a method of responding to a power management event in a computing device having programmable state transitions in accordance with a preferred embodiment of the invention.

FIG. 6 is a flowchart for a method of responding to a power management event in a computing device having programmable state transitions in accordance with a preferred embodiment of the invention. The method of FIG. 6 handles various programmed power management events, such as the scheduled time events described herein. Additionally, the method of FIG. 6 handles unscheduled (or unprogrammed) power management events.

As previously mentioned, an unscheduled power management event is an event that affects the delivery of operating power to the computing device. An example of an unscheduled power management event can be a signal communicated from a battery that indicates the battery is no longer capable of supplying sufficient current to operate the computing device in its present operating state. Another example of an unscheduled power management event can be the user depressing an "on" switch that places the computing device in the active state, or interacting with an input device used to initiate a state transition. A further example of an unscheduled power management event can be a timer-requested state transition, such as a timeout that automatically transitions the computing device after the user has left the device unattended.

The method of FIG. 6 begins at block 500 in which a power management event is received. The method continues at block 505 in which a determination is made as to whether the received power management event has been requested by a time event flag. If the received power management event is the result of receiving a time event flag, the method continues at block 550, in which the computing device waits for the next power management event flag.

If the received power management event is not the result of receiving a time event flag, meaning that the received power management event represents an unscheduled event, the method continues at block 510 in which the current time event flag, such as the flag stored in the current time event register, is canceled. This cancellation prevents the computing device from programmably transitioning to an active state when a battery, for example, can no longer provide the required current to operate the computing device in the active state.

The method continues at block of 520 in which a determination is made as to whether the unscheduled power management event is a request to transition to an active state from a standby or hibernate state. If the decision of block of 520 indicates that the unscheduled power management event is a request to transition to an active state, block 540 is executed in which a decision is made as to whether the current time of day corresponds to a scheduled active period, such as the 1:00 PM to 6:00 PM period of FIG. 2. In the event that the current time of day corresponds to a scheduled active time period, block 560 is executed in which the current time event flag is set to either hibernate or standby, depending on the desired programmed state transitions. If the current time event flag is programmed to enter the hibernate state, the computing device is placed into the hibernate state the next time the real-time clock attains a programmed time (e.g. 6:00 PM). If the current time event flag is programmed to enter the standby state, the computing device can be placed into a standby state at the next programmed time.

If the decision of block 540 indicates that the current time of day does not correspond to a scheduled active time period (such as from 6:00 PM to 8:00 AM on the following day), the method continues at block 550 in which the computing device waits for the next power management event before returning to block 500 and without setting the current time event flag to hibernate. This can be useful in the event that the user is operating the computing device in the evening (e.g. after 6:00 PM) and does not wish the computing device to transition to hibernate upon the next programmed time event (e.g. 6:00 AM).

Returning now to block 520, if the decision of block 520 does not indicate that the unscheduled power management event is a request to transition to an active state, block 530 is executed in which a determination is made as to whether the unscheduled power management event is a request to transition to a standby state. If a standby state has been requested, block 570 is executed in which a decision is made as to whether the current time of day corresponds to a scheduled active time period (e.g. 8:00 AM to 12:00 PM). If the current time of day does correspond to a scheduled active time period, block 590 is executed in which the current time event flag is set to hibernate. By setting the current time event flag to hibernate, the computing device is prepared to enter the hibernate state at the next programmed transition time. This can be useful when the user sets the computing device to the standby state in the afternoon (for example) wherein the next programmed transition time should place the computing device in hibernate, at 6:00 PM. The method then continues at block 550 in which the computing device waits for the next power management event.

If the decision of block 570 indicates that the current time of day does not correspond to a scheduled active time period, block 600 is executed in which the transition to standby is rejected. Block 610 is then executed in which the current time event flag is set to standby, and block 620 is executed in which the computing device is requested to transition to hibernate. This can be useful when the user sets the computing device to a standby state during a time period that corresponds to the computing device's hibernate period (e.g. 6:00 PM to 6:00 AM). In this case, setting the current time event flag to standby and transitioning the device to hibernate allows the device to transition to standby at the next programmed time (such as 6:00 AM). Control then returns to block 550.

Returning to decision block 530, if the decision of block 530 indicates that the unscheduled power management event is not a request to transition to a standby state, block 580 is executed in which a decision is made as to whether the unscheduled power management event is a request to transition to a hibernate state. If the decision of block 580 indicates that the unscheduled power management event is not a request to transition to a hibernate state, the method returns to block 550 in which the device waits for the next power management event. This can be useful in response to a battery-related event, such as a drop in voltage output, in which it may be advantageous for the computing device to wait for the next power management event, such as the user requesting an active state after the battery has been charged.

If the decision of block 580 indicates that the unscheduled power management event is a request to transition to a hibernate state, block 630 is executed in which the time event flag is set to standby. Control then returns to block 550. This can be useful when the user has requested the computing device to enter the hibernate state after using the device during the scheduled hibernate period (e.g. 6:00 PM to 6:00 AM). In this case, the computing device is prepared to enter the standby state at 6:00 AM.

In FIG. 6, various blocks have been included in the method in order to illustrate details that may be useful in some applications. However, another method of responding to a power management event in a computing device having programmable state transitions may only require the cancellation of a current time event flag (block 510), an unscheduled power management event determination block (such as block 520), a current time of day determination block (such as block 540), as well as storing one of a standby and a hibernate current time event flag in memory (block 560) if the unscheduled power management event is a request to transition to an active state and if the current time of day corresponds to a scheduled active time period.

FIG. 7 is a flowchart for a method of responding to a time event used in a computing device having programmable state transitions in accordance with a preferred embodiment of the invention. The method of FIG. 7 begins at block 700 in which a time event signal is received by a processor. The method continues at block 710 in which a current time event flag register is read in order to determine the event that corresponds to the received time event signal. If the current time event flag indicates a request to set the computing device to a hibernate state, block 720 is executed in which the current time event flag is set to standby. By setting the current time event flag to standby, the computing device is prepared for the next transition, which, for the state transitions of FIG. 2, would be the transition to the standby state (6:00 AM).

The method continues at block 730 in which a decision is made as to whether the computing device is being requested to transition from the standby state to the hibernate state. If the computer is being transitioned from the standby to the hibernate state, block 770 is performed in which the computing device is transitioned to hibernate. The method continues at block 780 in which the processor waits for the next time event. If the decision of block 730 indicates that the computing device is not being transitioned from standby to hibernate, indicating that the computing device is in an active state, block 760 is executed in which a confirmation panel is presented. The confirmation panel allows a user, who might be interacting with the device, to stop the programmed transition to the hibernate state. If the user confirms the transition, or after a specified time period, the method continues at block 770 in which the transition to hibernate is requested. Block 780 is then executed in which the processor waits for the next time event.

Returning now to the decision of block 710, if the current time event flag read from the current time event flag register does not indicate a request to set the computing device to hibernate, block 740 is executed in which the time event flag is set to hibernate. The method continues by executing block 750 in which a transition to hibernate is requested. Block 780 is then executed in which the processor waits for the next time event. Control returns to block 700, thus preparing the processor to receive the next time event flag.

In FIG. 7, various blocks have been included in the method in order to illustrate details that may be useful in some applications. However, another method of a responding to a time event used in a computing device having programmable state transitions may only require determining if the time event flag is a request to set the computing device to a hibernate state (such as in block 710), setting a time event flag to standby if the time event flag is set to hibernate (such as in block 720), and requesting the computing device to enter the hibernate state (such as in block 770).

While the present invention has been particularly shown and described with reference to the foregoing preferred and alternative embodiments, those skilled in the art will understand that many variations may be made therein without departing from the spirit and scope of the invention as defined in the following claims. This description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element of the equivalent thereof, such claims should be understood to include incorporation of one or more such elements, neither requiring nor excluding two or more such elements.

What is claimed is:

1. In a computing device having programmable state transitions, a method for responding to a power management event, comprising:

canceling a time event flag stored in a memory location;

determining said power management event;

storing a second time event flag into said memory location, wherein said second time event flag is set to one of a standby and a hibernate state, said storing occurring if said power management event is a request to transition to an active state and if a current time of day corresponds to a scheduled active time period; wherein if said power management event is a request to transition to said standby state and if said current time of day does not correspond to a scheduled active period, then additionally performing:

rejecting said request to transition said computing device to said standby state;

setting said second time event flag to standby; and setting said time event flag to hibernate.

2. The method of claim 1, wherein said second time event flag is a request to transition to said hibernate state.

3. The method of claim 1, wherein said second time event flag is a request to transition to said standby state.

4. The method of claim 1, wherein if said power management event is a request to transition to a hibernate state, then additionally performing:

setting said time event flag to hibernate.

5. In a computing device having programmable state transitions, a method for responding to a time event flag, comprising:

determining if said time event flag is a request to set said computing device to a hibernate state;

setting a second time event flag to standby if said time event flag is set to hibernate; and requesting said computing device to enter said hibernate state, wherein if said time event flag is not a request to set said computing device to a hibernate state, the method further comprising:

setting said second time event flag to hibernate; and requesting said computing device to enter a standby state.

6. The method of claim 5, additionally comprising prompting a user of said computing device to confirm that said computing device should enter said hibernate state, said prompting being performed prior to said requesting action.

7. One or more computer-readable media having computer-readable instructions thereon, which, when executed by a computer, cause the computer to generate a file used to transition from a hibernate to a standby state, the method comprising:

canceling a time event flag stored in a memory location;

determining said power management event;

storing a second time event flag into said memory location, wherein said second time event flag is set to one of a standby and a hibernate state, said storing occurring if said power management event is a request to transition to an active state and if a current time of day corresponds to a scheduled active time period, wherein if said power management event is a request to transition to said standby state and if a current time of day does not correspond to a scheduled active period, then additionally performing:

rejecting said request to transition said computing device to said standby state;

setting said second time event flag to standby; and setting said time event flag to hibernate.

8. One or more computer-readable media having computer-readable instructions thereon, which, when executed by a computer, cause the computer to generate a file used to transition from a hibernate to a standby state, the method comprising:

determining if said time event flag is a request to set said computing device to a hibernate state;

setting a second time event flag to standby if said time event flag is set to hibernate; and requesting the computing device to enter the hibernate state, wherein if said time event flag is not a request to set said computing device to a hibernate state, the method further comprising:

setting said second time event flag to hibernate; and
requesting said computing device to enter a standby state.

9. The computer-readable media of claim 8, wherein the method further comprises prompting a user of said computing device to confirm that said computing device should enter said hibernate state, said prompting being performed prior to said requesting action.

10. The computer-readable media of claim 7, wherein said second time event flag of the method is a request to transition to said hibernate state.

11. The computer-readable media of claim 7, wherein said second time event flag of the method is a request to transition to said standby state.

12. The computer-readable media of claim 7, wherein if said power management event is a request to transition to a hibernate state, then the method additionally performing:

setting said time event flag to hibernate.

* * * * *

UNITED STATES PATENT AND TRADEMARK OFFICE
CERTIFICATE OF CORRECTION

PATENT NO. : 6,961,859 B2  
APPLICATION NO. : 10/066378  
DATED : November 1, 2005  
INVENTOR(S) : Derocher et al.

It is certified that error appears in the above-identified patent and that said Letters Patent is hereby corrected as shown below:

Col. 10 (line 51), delete "a current" and insert therefor -- said current--.

Signed and Sealed this

Eighth Day of August, 2006

JON W. DUDAS  
*Director of the United States Patent and Trademark Office*